United States Patent [19]

Eccleston

[11] Patent Number: 5,050,937
[45] Date of Patent: Sep. 24, 1991

[54] CONTROLLER FOR ELECTRIC BRAKING SYSTEMS

[75] Inventor: Larry Eccleston, Marshall, Mich.

[73] Assignee: Tekonsha Engineering Company, Tekonsha, Mich.

[21] Appl. No.: 390,617

[22] Filed: Aug. 7, 1989

[51] Int. Cl.$^5$ .............................................. B60T 8/16
[52] U.S. Cl. .......................................... 303/7; 303/20
[58] Field of Search ........................... 303/7, 20, 24.1; 188/112 R, 112 A

[56] References Cited

U.S. PATENT DOCUMENTS

| | | | |
|---|---|---|---|
| 3,738,710 | 6/1973 | Pokrinchak et al. | 303/20 |
| 3,780,832 | 12/1973 | Marshall | 303/7 |
| 3,908,782 | 9/1975 | Lang et al. | 303/7 X |
| 3,909,075 | 9/1975 | Pittet, Jr. et al. | 303/7 X |
| 3,953,084 | 4/1976 | Pittet, Jr. et al. | 303/24.1 |
| 3,955,652 | 5/1976 | Nilsson et al. | 303/7 |
| 3,967,863 | 7/1976 | Tomecek et al. | 303/7 |
| 3,981,542 | 9/1976 | Abrams et al. | 303/7 |
| 3,981,544 | 9/1976 | Tomecek et al. | 303/20 |
| 4,030,756 | 6/1977 | Eden | 303/24.1 |
| 4,050,550 | 9/1977 | Grossner et al. | 303/7 X |
| 4,084,859 | 4/1978 | Bull et al. | 303/7 X |
| 4,721,344 | 1/1988 | Frait et al. | 303/7 X |

*Primary Examiner*—Matthew C. Graham
*Attorney, Agent, or Firm*—Price, Heneveld, Cooper, DeWitt & Litton

[57] ABSTRACT

The specification relates to electronic controllers for braking systems, such as those used to actuate the brakes on towed vehicles in response to commands from the towing vehicle. The controller is responsive to an inertial sensor and/or manual control, and is completely independent of the towing vehicle brake light circuit. The controller includes a constant frequency variable pulse-width modulator which interacts with the towed vehicle braking system through a power MOSFET switch, which is preferably of N-channel configuration, that comprises the control element for the braking current supplied to the electromagnets that actuate the towed vehicle brakes. The controller advantageously includes a dual-slope integrator which provides a comparatively slow and gradually increasing control voltage to the variable pulse-width modulator, but discharges comparatively quickly to insure fast brake disengagement, in response to the inertial sensor or manual control. The controller preferably senses the voltage drop across the power MOSFET during conduction thereof to generate a control voltage input to the pulse-width modulator as well as a display circuit. The display circuit may include an LED bar graph which provides an indication of the magnitude of the current supplied to the brake electromagnets.

32 Claims, 1 Drawing Sheet

CONTROLLER FOR ELECTRIC BRAKING SYSTEMS

BACKGROUND OF THE INVENTION

This invention relates to controllers for electrically-actuated braking systems, such as those used to apply the brakes on towed vehicles (i.e., trailers) in response to commands from the towing vehicle. More particularly, the invention relates to electronic controllers for braking systems of the general type just noted which operate in response to inertial sensors and/or manually-actuated switches or the like to energize the electric brake-actuation components of such systems in a particular controlled manner.

In the past, electric brake-system controllers have progressed from relatively simple and crude circuits which were little more than manually-variable power switches, operated directly by the driver, to various types of comparatively improved and more sophisticated systems which apply either continuous or pulsing drive excitation to the electromagnetic brake shoe actuators located at the trailer wheels. For example, U.S. Pat. No. 3,738,710 shows a series current regulator which integrates an actuation signal obtained from the towing vehicle brake light circuit and applies continuous braking excitation whose magnitude is basically proportional to the length of time the towing vehicle brakes are actuated, or in any event, proportional to the length of time the brake lights are energized in the towing vehicle. Most other control circuits for electric brakes apply pulsing excitation to the brake-actuating electromagnets, since it is widely thought that such pulsing excitation helps obviate lock-up or skidding of the trailer brakes. Some such controllers utilize a constant pulse-width applied at varying frequencies which increase in accordance with the amount of braking desired, while others utilize a constant-frequency variable-pulse-width form of excitation, for similar reasons. For example, see prior U.S. Pat. Nos. 3,909,075, and 3,953,084, addressed to the second such type of system, together with U.S. Pat. No. 3,967,863, which is directed to the first such type of system, all of which utilize both inertial-sensing and manually-actuatable input devices and apply braking excitation as a function of whichever such device is controlling.

While all of the aforementioned state of the art-type systems no doubt have their individual advantages and favorable features, most also involve certain characteristic limitations or undesirable characteristics. For example, continuous braking excitation is indeed likely to promote trailer brake lock-up, and that is a most undesirable event since it brings about a marked decrease in braking efficiency and loss of operator control. Further, the mere length of time during which the brake light circuit happens to be energized may very well not accurately represent the desirable magnitude of braking force to be applied to the trailer brakes in a given situation. On the other hand, where pulsating brake excitation is utilized, variable-frequency systems usually include some actuation frequencies which unfortunately complement or reinforce resonant frequencies in the vehicle braking systems (whether mechanical, electromechanical or electromagnetic in nature), with the result being instability, brake chatter, etc. Indeed, even pulse width-modulated (variable-pulse-width) constant-frequency systems sometimes utilize operational frequencies which have such adverse characteristics, and are likely to have other disadvantages as well.

One common incident of practically all state of the art electronic brake-system controllers is the fact that they utilize, and in fact require, interconnection with the vehicle brake light circuit. This is conventionally felt to be essential in such systems, because it is widely thought that the controller must be kept disabled, i.e., in a condition where it is not capable of providing braking excitation, except for the specific instances when either the manual control switch is actuated or else the towing vehicle brakes are actually being applied, as verified by the presence of the brake light signal. The main reason underlying this conviction is the fact that the stability of prior art inertial sensors and control circuits has not been sufficiently reliable under any and all potential operating conditions to preclude inadvertent and undesired brake actuation under various conditions, for example, in response to such extraneous effects as rough road surfaces, etc.

While using the tow vehicle brake light signal for the purpose just noted did prove to be a reasonably effective measure for coping with the problem of inadvertent brake actuation, this measure nonetheless created a number of problems itself, as well as involving at least some inherent uncertainties. For example, mechanical or electrical failure in the brake light circuit entirely extraneous to actual towing vehicle performance could result in the loss of all trailer braking. Furthermore, with the increasing sophistication of modern-day vehicles, the brake light circuit has grown increasingly complex, since it is now directly intercoupled with such other systems as electronic cruise controls, anti-skid braking systems, etc., and as a result each such system becomes more interdependent and subject to failure or malfunction caused by the others. Furthermore, while cruise controls, anti-skid braking systems, etc., are usually built into the tow vehicle at the factory, this is not true of trailer brake controllers, which are aftermarket devices installed by others. Thus, with the increasing complexity of vehicles and systems related to their brakes and brake-light actuation systems, it becomes increasingly more difficult, as well as more risky and potentially damaging, to physically breach the factory-installed wiring in order to interconnect the brake light circuit with aftermarket devices.

In addition, prior art electronic controllers for electric brake systems have had a number of other disadvantages and limitations, in particular operating inefficiencies attended by the use of excess power and the production of excess heat. Thus, typical prior art systems utilize resistive-type current-sensors for detecting the presence of excess braking current and initiating various forms of interruptors,,for safety purposes, and to prevent controller burn-out. Further, state of the art controllers utilize inefficient drive components such as bi-polar power transistors and the like, thereby using excess power and requiring extensive heat-dissipation means, i.e., heat sinks.

BRIEF DESCRIPTION AND FEATURES OF THE PRESENT INVENTION

The present invention effectively resolves many, indeed most, of the problems described above which characterize prior art controllers. In accordance with the invention, a new and more effective controller is provided through the combined effect of a number of distinct features which vary in both concept and implementation from those found in prior art devices, and which combine synergistically to provide an electronic brake controller which is both more effective and more efficient than those utilized heretofore.

More particularly, the controller of the present invention is both more stable and more responsive to important braking system criteria than prior controllers, and at the same time it is far more energy-efficient and cooler in operation, while also providing operational characteristics which avoid undesirable interaction with tow vehicle braking systems. More specifically considered, some of the more salient attributes of the present controller include complete independence from the tow vehicle brake light circuit, a new and novel variable-pulse-width-fixed repetition rate circuit which operates at high efficiency, effectiveness, and stability, and a new form of braking current controller output driver (pass element) of high efficiency, coupled with a new concept in braking current detection and display, for increased operator awareness, effectiveness, and operational flexibility, while at the same time featuring a new form of manual control for direct operator interaction apart from but in conjunction with steady-state and continuous vehicle inertia sensing control.

In a still more particular sense, the present invention provides a new form of electronic controller for electric braking systems which features a constant-frequency, variable-pulse-width modulator which interacts with the vehicle braking system through an N-channel power MOSFET, which is the control element for the braking current supplied to the electromagnets that actuate the brakes. The operational frequency for the controller is such as to avoid resonance problems in the braking assemblies of the trailer previously encountered in other systems, while at the same time facilitating efficient and effective component operation. The N-channel power MOSFET acting as the pass element has extremely low forward or "on" resistance, and improves the efficiency of the output stage by on the order of about ten times, in comparison to prior art systems, and circuit efficiency is further augmented by the implementation of novel braking current-sensing techniques, in which the voltage drop across the power MOSFET during conduction is sensed and used as a control signal, thereby eliminating the lossy and heat-producing series resistances utilized heretofore.

In accomplishing the foregoing goals, a novel power supply is utilized for driving the N-channel MOSFET, which constitutes a distinct departure from prior art electric brake controller concepts Furthermore, the controller in accordance herewith features, in combination with the aforementioned, constant-frequency, variablepulse-width circuit operation, a novel and effective dual-slope integrator which augments circuit responsiveness and stability during both inertially-responsive and manual control, while at the same time ensuring fast brake disengagement in response to corresponding inertial sensor or manual control, ensuring smooth and effective braking response to controller operation. Such dual-slope integration, together with the other control circuit components and features, as noted above, enable the novel controller to completely dispense with the customary interconnection with the tow vehicle brake light circuit, particularly when the controller is used in conjunction with the novel and advantageous inertial sensor disclosed and claimed in co-pending application Ser. No. 09/390,280 filed Aug. 7, 1989, titled PENDULUM-TYPE ACCELLERATOMER FOR ELECTRICALLY ACTUATED BRAKING SYSTEM, which is also assigned to the assignee of the present invention. Such mutual independence, or circuit isolation, is an important aspect of the braking system accomplished in accordance with the invention, since it avoids a number of significant problems and potential problems which have heretofore imposed a significant penalty upon manufacturers and users alike.

The foregoing features and attributes of the invention will become more apparent after contemplation of the ensuing more detailed description, particularly when considered with and in light of the accompanying drawing.

BRIEF DESCRIPTION OF THE DRAWING

In the accompanying drawing, comprising a single Figure.

DESCRIPTION OF THE PREFERRED EMBODIMENT

Figure 1:
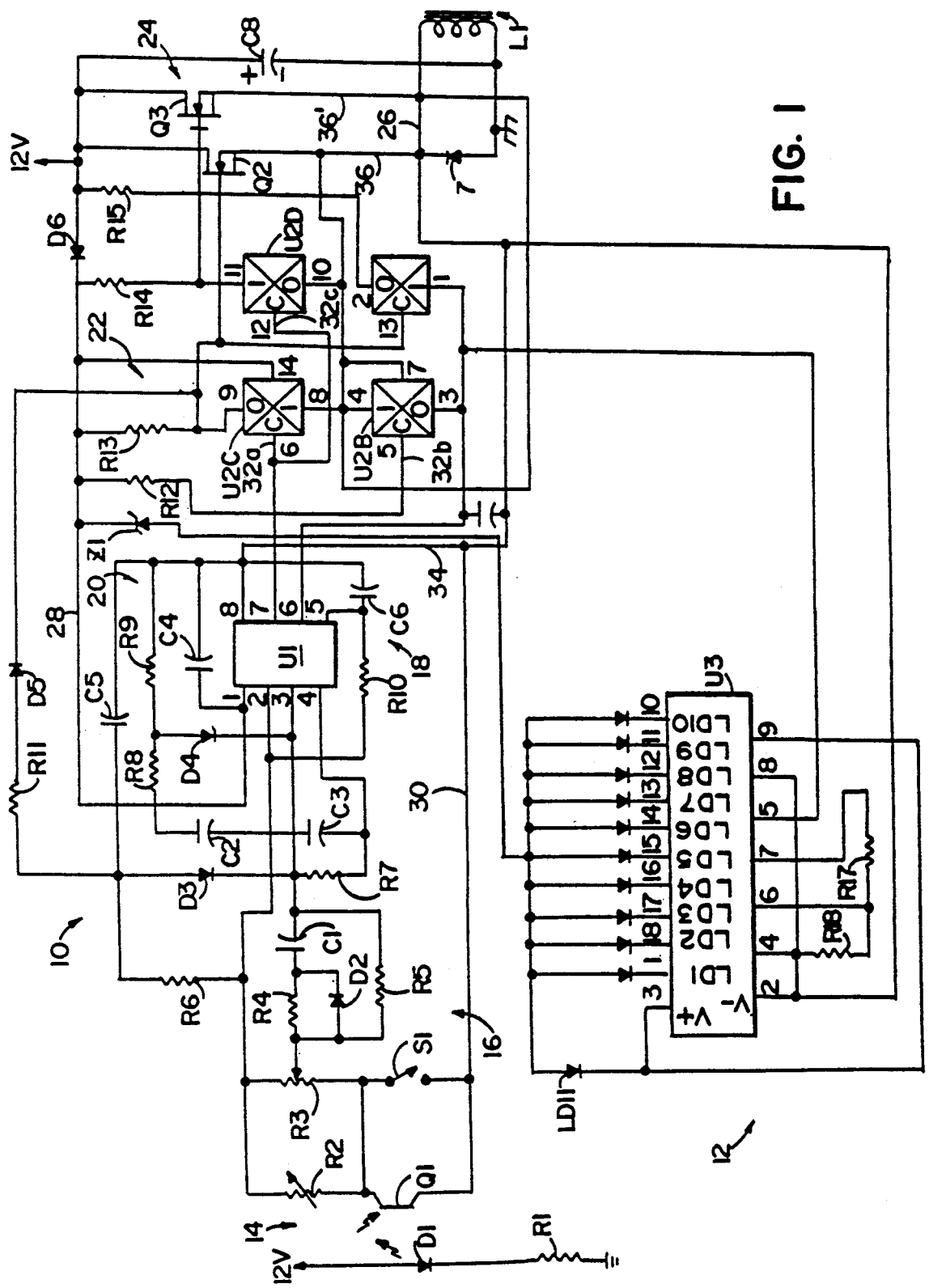
FIG. 1 is a schematic circuit diagram showing a preferred embodiment of the electronic controller in accordance with the invention.

With reference to FIG. 1, the upper portion of the circuit, designed generally by the numeral 10, comprises the braking current control portion of the circuit, while the lower portion, generally designated by the numeral 12, comprises the novel braking current display-generation means. Referring first to the braking current control portion of the circuit 10, the control circuit generally includes a detection and control portion 14 shown at the left and, proceeding toward the right, includes a dual-slope integrator section 16, a variable-pulse-width modulator 18 which includes an integrated circuit 20 and logic switch means 22 (both described in more detail hereinafter), and an output stage 24 comprising the aforementioned MOSFET elements, which may be single or double in form as described hereinafter. As shown, the output stage 24 has an output conductor 26 which comprises the connection to the towed vehicle (trailer) brake actuators, here symbolized by the large inductive winding labeled "L1," it being understood that in actual practice there will be a number of individual such inductances in parallel, each comprising the electromagnet which actuates one set of brakes at one wheel, all wheels usually being controlled simultaneously and in a substantially identical fashion.

With first reference to the detection and control portion 14 of the circuit 10, elements D1 and Q1 symbolize the signal-generating portions of the inertial sensor noted above, which is most preferably in accordance with that described in co-pending application Ser. No. 07/390,280. While an appropriate signal could, of course, be provided by other than electro-optical elements, the latter do provide a preferred embodiment of the invention, particularly in combination with the inertial sensor of the co-pending application just described. Thus, in a preferred embodiment, element D1 comprises an infrared light-emitting diode, and element Q1 comprises a corresponding phototransistor (both of which may desirably be implemented by use of Motorola components MLED 71 and MRD 701, respectively). As will be understood, the basic purpose of circuit portion 14 is to provide an analog control signal corresponding in magnitude to the extent of trailer braking desired, and thus an integral portion of circuit 14 is a manual switch S1, by which the towing vehicle operator may manually initiate measured braking effects on the trailer whenever desired, apart from the operation of the towing vehicle brakes and the corresponding inertial effects. In the preferred embodiment in accordance herewith, switch S1 comprises a membrane-type "touch pad" switch of an appropriate commercially-available type, the use of which in such a braking controller is believed to constitute a novel and desirable feature in and of itself. Apart from this, however, it will be observed that both the inertial sensor components and the manually-actuated components are effectively coupled between mutually-shared supply and ground conductors 28 and 30, respectively, through potentiometers R2 and R3, respectively, with an interconnecting line 31 extending between the lower-voltage side of each such potentiometer. As will be understood, potentiometer R2 is merely for the purpose of adjusting the operational range of the phototransistor Q1, to avoid circuit performance variation as a function of manufacturing tolerances in the optical components. Potentiometer R3, on the other hand, comprises a gain control for the entire control circuit 10, since it acts to set the level at which signals from the detection portion 14 are provided to the integrator portion 16.

The dual-slope integrator 16 comprises basically capacitor C1, resistors R4 and R5, and diode D2; also, this integrating section works in conjunction with another integrating section comprising capacitor C3 and resistor R7, in a manner described more fully hereinafter. More particularly, the signal from the detection and control section 14 of the circuit is coupled from the movable contact of potentiometer R3 to the first integrating section just noted and, due to the polarity of diode D2, together with the operational characteristics of integrated circuit U1, this results in a comparatively slow and gradual increase in control voltage (determined in essence by the time constant established by both resistors R4 and R5, together with capacitor C1), but with a much faster discharge time (established, in essence, by the value of only resistor R5 and capacitor C1, resistor R4 having been shunted out of operation by diode D2). Preferably, the value of resistor R5 is on the order of only about fifteen percent of that of resistor R4, such that the charging time constant of the integrator is about 1.5 second, whereas the discharge time is about 0.1 second.

Integrated circuit U1 is utilized as a comparatively simple pulse-width modulator, and may be implemented by use of the commercial IC No. 5561, which basically includes an internal operational amplifier, comparator, and sawtooth wave generator. As utilized in the present application, the inverting input of the internal operation amplifier (pin 3) is coupled to integrator 16, in particular to the "low" side of capacitor C1, and to the common junction of resistor R7 and capacitor C3. The output of such internal "op amp" appears on pin 4, and is connected to the opposite common junction of capacitor C3 and resistor R7. It will be observed that positive operating voltage ("B+") for the entire control circuit 10 is provided on the aforementioned supply conductor 28 which, among other connections, is coupled to pin 1 of integrated circuit U1. As will be explained subsequently in more detail, control circuit 10 utilizes a "flying" power supply concept, in which conductor 30 functions as a floating ground, and it will be noted that the latter is coupled to pin 8 of IC U1 through conductor 34. The primary output from integrated circuit U1 appears on pin 7 thereof, and this is coupled to the logic switch means 22 by conductors 32 (and its interconnecting branches 32a, 32b, 32c, which are also connected to the B+supply line 28 through resistor R12).

The logic switch means 22 may be implemented, in accordance with the embodiment here under discussion, by a four-part analog switch, e.g., the commercially-available element designated by the identifier "CD4066," the four operational components of which are illustrated separately for convenience in FIG. 1 and designated "U2a, U2b, U2c," etc. Basically, this compound switch operates in conjunction with the output from the pulse-width modulator (pin 7 of U1) to control conduction of the MOSFET output transistor Q2 (and, where higher levels of current are needed, a second such MOSFET designated here as Q3, which is to be understood as being optional, depending upon the level of current output needed).

As indicated previously, the output stages Q2 and Q3 are preferably N-channel devices, whose use in this environment is accomplished, in the embodiment under consideration, by use of a floating-ground "flying" power supply which, in effect, doubles the available power level, so as to make it possible to use N-channel MOSFET devices as output stages Q2 and Q3 (for example, by use of the commercially-available N-channel devices identified as SMP50N05). Logic switch 22 thus functions as an integral part of this "flying" power supply by performing the necessary switching, in conjunction with a "pull-up" circuit comprising capacitor C8 and diode D7. As illustrated, these components are connected across output stages Q2 and Q3, and between twelve volt supply conductor 28 and the floating ground conductor 30, the latter in fact providing the excitation appearing on output conductor 26 noted previously, leading to the brake-actuation electromagnets L1.

Somewhat more particularly, the operation of control circuit 10 is as follows. Internally, the non-inverting input of the operational amp in integrated circuit U1 is tied to a 3.75 volt reference and, as noted above, the dual-slope integrator 16 connected between the detector and control section 14 and the PWM section 18 is connected to the inverting input of IC U1, i.e., on pin 3. Thus, in response to control voltages from circuit 14 calling for the application of braking current, the collector of the internal op amp in IC U1 is pulled down and divided by potentiometer R3, current being applied through resistors R5 and R4 at a rate determined by the longer time constant of the dual-slope integrator 16. The output of the internal op amp in IC U1 appears on pin 4 thereof, which is thus affected by the time constant of the network including capacitor C3 and resistor R7, which forms a second integrator. Thus, initially, current is drawn out of the summing point represented by the inverting terminal of the internal op amp, whose output thus responds accordingly. The op amp output appearing on pin 4 is applied internally to a comparator which conducts a continuing comparison of that signal to a standard sawtooth wave form, so as to continually change the proportion of conduction. In accordance with the present application, a pulse-repetition rate of approximately 300 Hz is chosen, to best complement the braking systems being actuated (i.e., to best accommodate brake magnet performance with maximal isolation from natural mechanical resonances typically encountered). Accordingly, the output from the PWM (IC U1), appearing on pin 7, constitutes a repetitive pulse whose width is a function of the control signal from circuit portion 14, as a function of the internal comparison with the aforementioned sawtooth wave. This output from pin 7 is inverted through the analog switch stage 22 and applied to the gate of output MOSFET Q2 (and, where used, the second MOSFET Q3), to provide brake-actuating excitation on output conductor 26.

As noted above, previous systems have used PNP transistors, with the emitter connected to battery positive and the collector to the brake magnets, which in turn connect to ground. The base drive is applied by pulling base current from the transistor to ground. The base current out of the base causes collector current to flow, thereby energizing the brake magnets. It would be analogous to this to use a P-channel MOSFET in the present application, since one could configure the circuit the same as with the PNP transistor, with the source connected to battery positive and the drain connected to the brake magnets which in turn connect to ground. However, P-channel MOSFETs of sufficiently low on resistance and current handling capacity are simply not available as of this point in time. Paralleling higher-resistance devices would work, but the cost would be prohibitive. Accordingly, the present invention utilizes an N-channel MOSFET, even though this requires a substantially different and more involved circuit configuration. The configuration required is that of a source-follower, but this configuration requires that the MOSFET gate always be driven positive with respect to the source in order to cause conduction. Because the source rises to very near battery positive when the MOSFET is turned on, it is necessary that the gate be driven to a potential greater than battery potential. That is, an N-channel MOSFET requires that the gate be driven positive with respect to the source to cause conduction of the MOSFET. In a normal grounded-source configuration, gate drive is simply applied from a normal five to twenty volt source. The load would then be connected between the drain and the positive supply, and power would be delivered any time the gate was above threshold. In the present case, it is required that the brake magnets operate against ground, mostly because of tradition in the automotive industry. The high end must therefore be driven positive to battery potential.

Accordingly, where the preferred N-channel MOSFET devices are utilized, so as to provide maximum circuit efficiency and minimum losses, the operational parameters encountered in typical vehicle-trailer environments, involving a negative-ground twelve volt power supply, requires a pull-up, "flying" supply which in effect doubles the available voltage level to provide above-rail drive to the MOSFET gate. In the circuit configuration shown in FIG. 1, the MOSFET gate supply is referenced to the voltage applied to supply conductor 28, but at a level which is effectively increased through the operation of capacitor C4 and diode D6, which is series-connected in supply line 28. Thus, when output transistor Q2 (and Q3, where used) is non-conducting, capacitor C4 charges to the level present on conductor 28 through diode D6, through a charge path which includes the brake magnet coils L1. When the output transistors are turned on and conduct, the supply effectively rises with the source because diode D6 then allows the positive terminal of capacitor C4 to "bootstrap" up to a value of twice the applied B+. Since the gate drive for output MOSFETs Q2 and Q3 is supplied from conductor 28, through resistors R13 and R14, the foregoing charge state of capacitor C4 causes a corresponding supply condition to be present as gate drive. Of course, other voltage-doubling circuits are known and could be used, but most others utilize more expensive components, e.g., transformers, etc., and, under the circumstances present in the use of the circuit under discussion, the logically-switched "floating" supply concept works well for the intended purpose.

In order to preclude capacitor C4 from fully discharging, and thereby losing drive, the duty cycle should be set to a level slightly less than full-cycle, to ensure time for capacitor recharge during the output transistor off time. Accordingly, it will be observed that capacitor C4, which serves to boost the operating level of the entire control circuit to a level essentially twice that of the B+ actually supplied, recharging through the tow vehicle ground circuit, i.e., through the brake magnets, since when the brake-energizing line 26 is driven in a negative direction, a current pulse is supplied to capacitor C4 through conductor 34 from floating ground conductor 30. When this is completed, i.e., when the cycle ends, the polarity of diode D6 causes the supply level to continue to increase. Accordingly, the inductive load comprising the brake-actuation electromagnet coils functions to provide a constant current flow through them which is a function of the "duty cycle" of the applied pulse, i.e., the pulse-width. The duty cycle control, in turn, is set up through resistor R11 and diode D5, plus resistor R6 and diode D3, which are coupled between pins 2 and 3 of the PWM IC U1 and the logic switch 22, the output from the PWM IC, on pin 7, being applied through logic switch 22 to the output transistors in stage 24. Thus, the circuit operates to inject current into pin 3 of the pulse-width modulator U1 when the duty cycle exceeds the selected level, and this reduces the pulse-width from the PWM stage. It is, in effect, negative feedback, which establishes the maximum duty cycle of circuit U1.

Circuit duty cycle as a function of output current is an important function played by the logic switch 22. Thus, when gate drive of output transistors Q2 and Q3 is applied using section U2c of logic switch 22, section U2b is turned off as a clamp and section U2d is turned on as a voltage sensor, being connected to brake actuation line 26 through conductor 36 to the common connection node of output transistors Q2, Q3, and conductor 26. This in effect senses the voltage across output transistors Q2 (and, where used, Q3), and applies the sensed voltage back as a signal to pin 6 of the PWM (i.e., integrated circuit U1). That voltage level is proportional to the current flow through the vehicle brakes, with a typical "on" resistance of an extremely low level. The sensed voltage drop across Q2 and Q3 should be referenced to the MOSFET source, and therefore both U1 and U3 are operated from the same flying supply, with their negative terminals common to the source. Because U2 is driven from U1, it also is referenced to the flying source. Accordingly, the pulse-width modulator 41 will turn off if current exceeds a pre-set limit, thereby establishing a selected duty cycle which corresponds directly to the level of current flow through the trailer brake electromagnets. Furthermore, such turnoff provides an effective short-circuit protection of the brake magnet actuation line. Accordingly, if the output transistors for any reason overheat and their conducting resistance rises accordingly, the current limit for excitation to the brake magnets will be cut back correspondingly, to maintain circuit performance.

The same voltage sensed and applied to the pulse-width modulator U1 as a measure of output current, as just described, is also applied to the display circuit 12, which preferably comprises an LED bar-graph driver U3, for example of the type known as an LM3914, which includes an internal voltage divider and a set of ten comparators. The resulting function is that as the voltage across output transistor Q2 increases during its operating cycle, in proportion to the current through the brakes, the bar-graph driver will progressively energize one after another of the LEDs which it controls (identified in FIG. 1 as LD1, LD2, etc.). Accordingly, the operator of the towing vehicle will have available a direct display of the magnitude of braking current actually being applied (as opposed to the level of voltage applied to the brakes, which is no indication whatever of the magnitude of the energizing current, as the connection to the brake-actuators may have been lost). Thus, for perhaps the first time, the vehicle operator is provided a direct measure of braking current and, at the same time, the LED display functions as a circuit-connection indicator since unlike a voltage-responsive indicator, the current-indicative LED display will of course never become illuminated in a situation where brake-energizing line 26 becomes broken, disconnected, etc., inasmuch as no current can flow through the output FETs under such circumstances and there will be no corresponding voltage drop across the FETs under such circumstances.

At the same time, it is desirable to provide a separate indicator to positively show the ongoing presence of an appropriate circuit connection to the trailer brake line, for the continuous reassurance of the operator, and this is accomplished in accordance with the invention by an additional LED, connected across the lamp driver circuit U3, represented in the drawing by LD11, which is preferably of a contrasting color to those directly driven by the lamp driver (e.g., green versus red). That is, LD11 is in effect in series with the supply energizing lamp driver U3 (through conductor 38 and the regulating diode Z1). Thus, if the trailer brake connection line 26 should become disconnected, lamp driver U3 will no longer draw its operating current from supply conductor 28, and indicating diode LD11 will no longer illuminate.

To briefly summarize, the initiation of braking current to the electric brake magnets occurs in response to either inertial sensing or manual control and comprises current pulses which occur at varying duty cycles but at a constant, predetermined frequency selected to complement that of the vehicle braking system. The duty cycle of the brake-actuation current pulses is a function of the magnitude of the control signal, i.e., either the magnitude of the braking inertia sensed or the magnitude of the signal produced by actuation of the manual control; at the same time, however, the maximum possible duty cycle is established at a level which protects the circuit components, in particular the output transistors. Further, however, the control signals which call for increasing braking levels are applied through an integrator which exhibits a first, more gradual, time constant during braking actuation, so as to ensure smooth and uniform application of brake magnet-energizing current, but the removal of brake-energizing current in response to a decrease or termination of control signal is accomplished in a much faster, essentially instantaneous manner, inasmuch as the controlling integrator is of dual-slope configuration.

Accordingly, the controller in accordance herewith may be thought of as providing a functional analogue to previous controllers which were switched on and off by interconnection with the towing vehicle brake light circuit, even though the present control circuit deliberately avoids interconnection with such brake light circuit. The slower, initial slope of the dual-slope integrator 16 helps obviate the need for any interconnection to the towing vehicle brake light circuit for safety purposes, since even though the preferred inertial sensor identified hereinabove (i.e., that which is the subject of co-pending application Ser. No. 07/390,280 is substantially immune to erratic operation and inadvertent braking signal commands in response to merely rough roads and the like, the comparatively slow ramp-up and rapid ramp-down provided by the dual-slope integrator in accordance herewith will in effect delay and dissipate random, isolated inertially-sensed control signals, such as might result from rough roads and the like, integrating them over time while they occur and discharging the integration value rapidly, with the effect being substantially no braking applied to the trailer wheels under such conditions, where braking is in fact not desired.

Finally, it is to be pointed out once again that the manual control switch S1 results in circuit operation directly comparable to that caused by the inertial sensor, operating through phototransistor Q1, i.e., manual switch S1 parallels the phototransistor Q1 so that when the manual switch is actuated by the operator the control voltage applied to the pulse-width modulator U1, and the onset of the output from this circuit, will ramp-up in a gradual manner, increasing continuously throughout the period of time during which the manual switch is actuated, whereas the reverse effect occurs upon discontinuation of the manual control. That is, the braking effect will immediately decrease upon discontinuation of the manual control command. Of course, during the interval of manual control actuation, the LED readout of resulting brake-excitation current will continue to increase, each such individual LED indicating the application of an increased level of brake-energizing current.

In this connection, it will be appreciated that use of the preferred "touch pad"-type switch (e.g., membrane switch) offers a distinctively new and different form of trailer brake manual control, since unlike prior art systems, there is no mechanical switch response, no elongated switch "throw," etc., and instead the operator merely rests his fingers, under moderate pressure, upon the actuating membrane switch and, as a function of the length of time this occurs, the trailer brakes will be energized in a progressive manner. On the other hand, as soon as the operator's hand is lifted from the touch pad control, the trailer brake actuation ceases. Of course, just as the application of braking current in response to operation of manual switch S1 occurs in the same manner and at the same rate of increase as that resulting from inertial sensor operation, the system gain control implemented by potentiometer R3 affects ensuing circuit operation in the same manner regardless of which sensor calls for braking actuation. That is, potentiometer R3 acts to set the maximum level of circuit response available, and is used to coordinate braking operation of a given trailer with that of a given towing vehicle, i.e., the operator uses potentiometer R3 to set the level of full-scale or maximal braking response to a safe level, less than lock-up, in response to maximum tow vehicle inertia effects.

It is to be understood that the foregoing description of a preferred embodiment of the invention is provided for purposes of the description and illustration, and not as a measure of the invention, whose scope is to be defined by reference to the ensuing claims. Thus, those skilled in the art may devise embodiments of the particular concepts presented in the foregoing illustrative disclosure which differ from the particular embodiment shown and described in detail herein, or may make various changes in structural details to the illustrated embodiment; for example, it is certainly possible to implement the dual-rate integrator in a variety of different ways, and indeed even the pulse-width modulator and the logic represented by analog switch 22, as well as the lamp-driver U3, could readily be implemented by microprocessor control, with appropriate programming. Accordingly, all such alternative or modified embodiments as utilize the underlying concepts of the invention and incorporate the spirit thereof are to be considered as within the scope of the claims appended herebelow, unless such claims by their language specifically state otherwise.

The embodiment of the invention in which an exclusive property or privilege is claimed are defined as follows:

1. An electronic controller for electrically actuated vehicle brakes driven from the vehicle power supply potential against battery ground, comprising in combination: means for producing control signals which are proportionally representative of the extent of vehicle braking desired; pulse-generation means coupled to receive representations of said control signals as a control input and adapted to produce a pulse train output whose effective magnitude is representative of such control signals; and output power driver means coupled to said pulse-generation means to receive said pulse train and provide corresponding output power pulses having a magnitude and character sufficient to energize and actuate said vehicle brakes, said power driver means comprising at least one power N-channel MOSFET element and said controller including means for supplying a potential to a gate of said N-channel MOSFET element greater than the vehicle power supply potential to thereby enable said MOSFET and actuate said vehicle brakes.

2. The electronic controller as defined in claim 1, and further including power supply means for such N-channel MOSFET device having a floating ground and adapted to effectively increase the magnitude of the operating power applied to said controller by energizing said MOSFET to conduct over a voltage range larger than that of said applied operating power.

3. The electronic controller as defined in claim 2, wherein said floating ground provides the output of said controller which is coupled to said vehicle brakes for actuation thereof.

4. The electronic controller as defined in claim 1, and further including means for detecting the voltage drop across said MOSFET element and using said voltage drop as a measure of the amount of braking current coupled to said vehicle brakes.

5. The electronic controller as defined in claim 4, wherein said means for detecting and using said voltage drop includes means for coupling a representation of said voltage drop back to said pulse-generation means as a controlling input to thereby cause a corresponding change in said pulse-train output.

6. The electronic controller as defined in claim 4, wherein said means for using said voltage drop includes means for varying the effective magnitude of said output power pulses as a function of said voltage drop.

7. The electronic controller as defined in claim 6, wherein said means for varying the effective magnitude of said output power pulses operates to limit such magnitude in response to said voltage drop attaining a predetermined value.

8. The electronic controller as defined in claim 7, wherein said means for varying the effective magnitude of said output power pulses includes said pulse-generation means.

9. The electronic controller as defined in claim 4, wherein said means for detecting and using said voltage drop includes means for visually displaying a representation of the relative magnitude of said drop corresponding to the energizing current applied to said vehicle brakes.

10. The electronic controller as defined in claim 9, wherein said means for visually displaying comprises a bar-graph display.

11. The electronic controller as defined in claim 10, wherein said bar-graph display comprises a coordinated sequence of light-emitting elements.

12. The electronic controller as defined in claim 1, and further including means for integrating said control signals before coupling representations thereof to said pulse-generation means, whereby said representations comprise a signal whose magnitude rises with time when said control signals continue without reduction.

13. The electronic controller as defined in claim 12, wherein said means for integrating is of dual-slope configuration, and has a longer rise time than it does a fall time.

14. The electronic controller as defined in claim 12, wherein said means for integrating has an integration time-constant on the order of about one and one-half seconds.

15. The electronic controller as defined in claim 14, wherein said means for integrating is of dual-slope configuration, and said rise time is longer than its fall time.

16. In an electronic controller for electricallyactuated vehicle brakes, of the type having means for producing control signals which are proportionally representative of the desired extend of vehicle braking and further having means for producing pulses of current whose effective magnitude is proportionally representative of the magnitude of said control signals, for correspondingly energizing said vehicle brakes, the improvement comprising means for gradually applying and increasing the effective magnitude of said current pulses produced for a given value of said control signals such that the resulting braking action commences at a first level and is gradually increased with the increase of the effective magnitude of the current pulses over an increased time period.

17. The improvement defined in claim 16, wherein said means for producing control signals includes a manually-actuable "touchpad" switch means.

18. The improvement defined in claim 17, wherein said means for gradually applying and increasing said current pulses comprises an integrator coupled between said means for producing control signals and said means for producing pulses of current.

19. The improvement defined in claim 18, wherein said integrator is of dual-slope configuration and has a discharge time constant which is shorter than its integration time constant.

20. The improvement defined in claim 16, wherein said means for producing control signals comprises an inertial sensor.

21. The improvement defined in claim 20, wherein said means for gradually applying and increasing said current pulses comprises a dual-slope integrator having a rise time longer than its fall time.

22. The improvement defined in claim 16, wherein said means for producing control signals includes a manually-actuable switch means.

23. The improvement defined in claim 22, wherein said means for gradually applying and increasing said current pulses comprises a dual-slope integrator having a rise time longer than its fall time.

24. The improvement defined in claim 22, wherein said means for producing control signals further includes an inertial sensor conjointly operative with said manually-actuable switch means.

25. The improvement defined in claim 24, wherein said means for gradually applying and increasing said current pulses comprises a dual-slope integrator having a rise time longer than its fall time, said dual-slope integrator being operatively coupled to both said manually-actuable switch means and said inertial sensor.

26. In an electronic controller for electrically-actuated vehicle brakes, of the type having means for producing control signals which are proportionally representative of the desired extent of vehicle braking and further having means for producing pulses of current whose effective magnitude is proportionally representative of the magnitude of said control signals, for correspondingly energizing said vehicle brakes, wherein said means for producing pulses of current comprises a switchable output MOSFET pass element, and including means for detecting the voltage drop across said pass element and using the detected voltage drop as a measure of braking excitation.

27. The improvement defined in claim 26, wherein said means for using the detected voltage drop comprises circuit means for limiting the braking excitation current pulses when said voltage drop exceeds a predetermined threshold value.

28. The improvement defined in claim 27, wherein said means for producing pulses of current includes pulse-width modulation means coupled to receive said control signals as an input and operative to produce an output pulse train representative of said control signals, said pulse-width modulation means comprising at least a portion of said circuit means for limiting braking excitation.

29. The electronic controller as defined in claim 26, wherein said means for detecting and using said voltage drop includes means for visually displaying a representation of the relative magnitude of said drop corresponding to the energizing current applied to said vehicle brakes.

30. The electronic controller as defined in claim 29, wherein said means for visually displaying comprises a bar-graph display.

31. In an electronic controller for electricallyactuated vehicle brakes, of the type having means for producing control signals which are proportionally representative of the desired extent of vehicle braking and further having means for producing pulses of current whose effective magnitude is proportionally representative of the magnitude of said control signals, for correspondingly energizing said vehicle brakes, the improvement comprising means for instantaneously sensing the relative magnitude of current being applied to said brakes as energization, means for visually displaying the sensed current magnitudes to the vehicle operator and means for visually indicating to the vehicle operator the presence of an operable circuit connection between said vehicle brakes and said controller.

32. The improvement defined in claim 31, wherein said means for visually displaying sensed current magnitude comprises a bar-graph display.

* * * * *

UNITED STATES PATENT AND TRADEMARK OFFICE
CERTIFICATE OF CORRECTION

PATENT NO. : 5,050,937

DATED : September 24, 1991

INVENTOR(S) : Larry (NMI) Eccleston

It is certified that error appears in the above-identified patent and that said Letters Patent is hereby corrected as shown below:

Column 3, Line 50
    After "concepts" insert --.--.
Column 3, Line 67
    "09/390,280" should be --07/390,280--.
Column 4, Line 25
    "designed" should be --designated--.
Column 12, Claim 16, Line 44
    "electricallyactuated" should be --electrically-actuated--.
Column 14, Claim 31, Line 23
    "electricallyactuated" should be --electrically-actuated--.

Signed and Sealed this

Twenty-first Day of September, 1993

Attest:

BRUCE LEHMAN

*Attesting Officer*     *Commissioner of Patents and Trademarks*